Patented Apr. 7, 1931

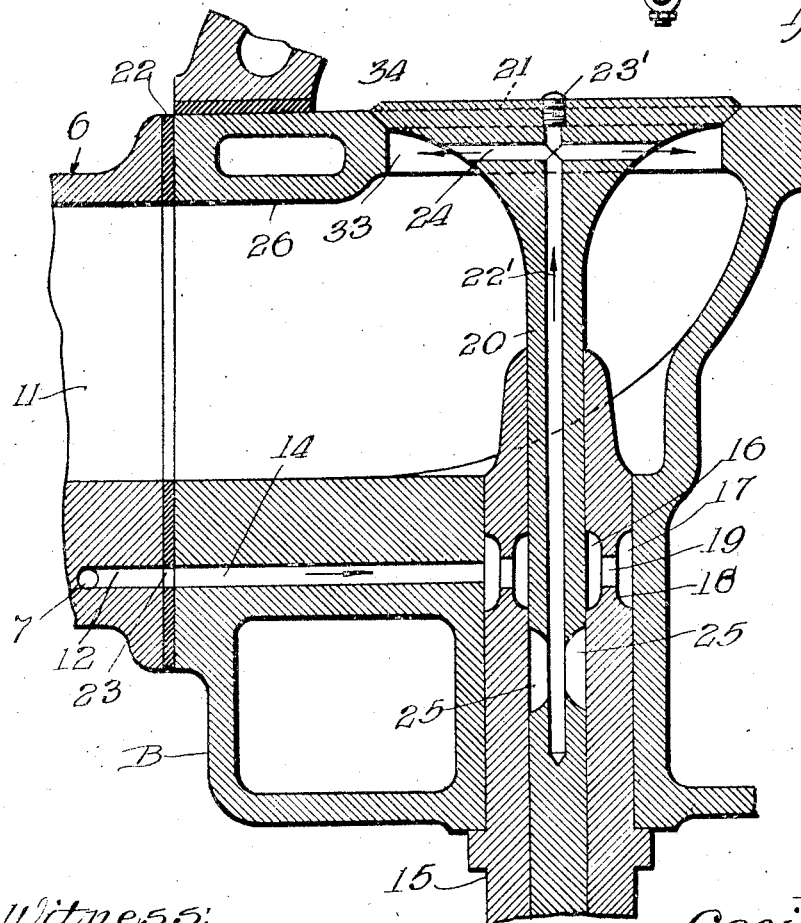

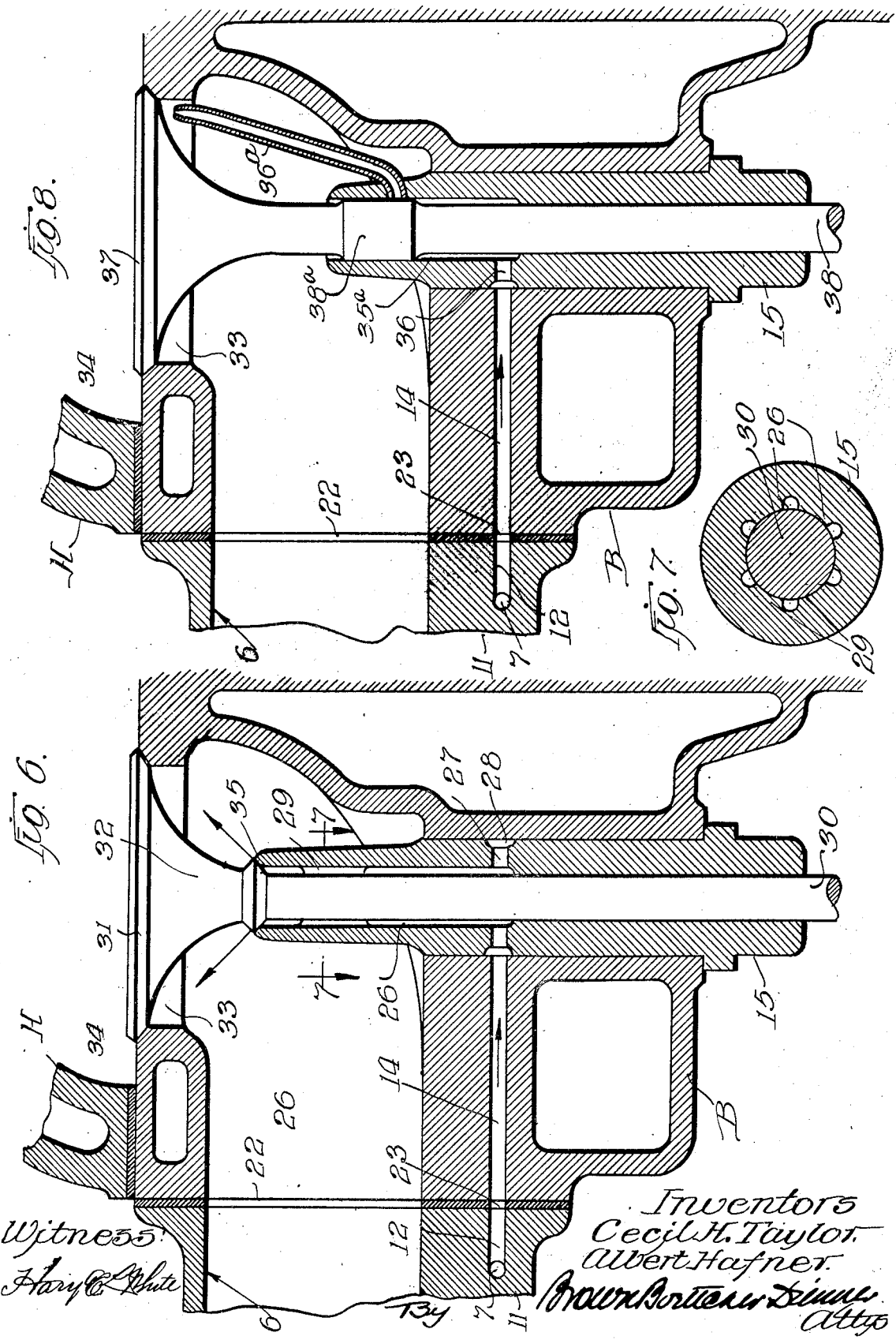

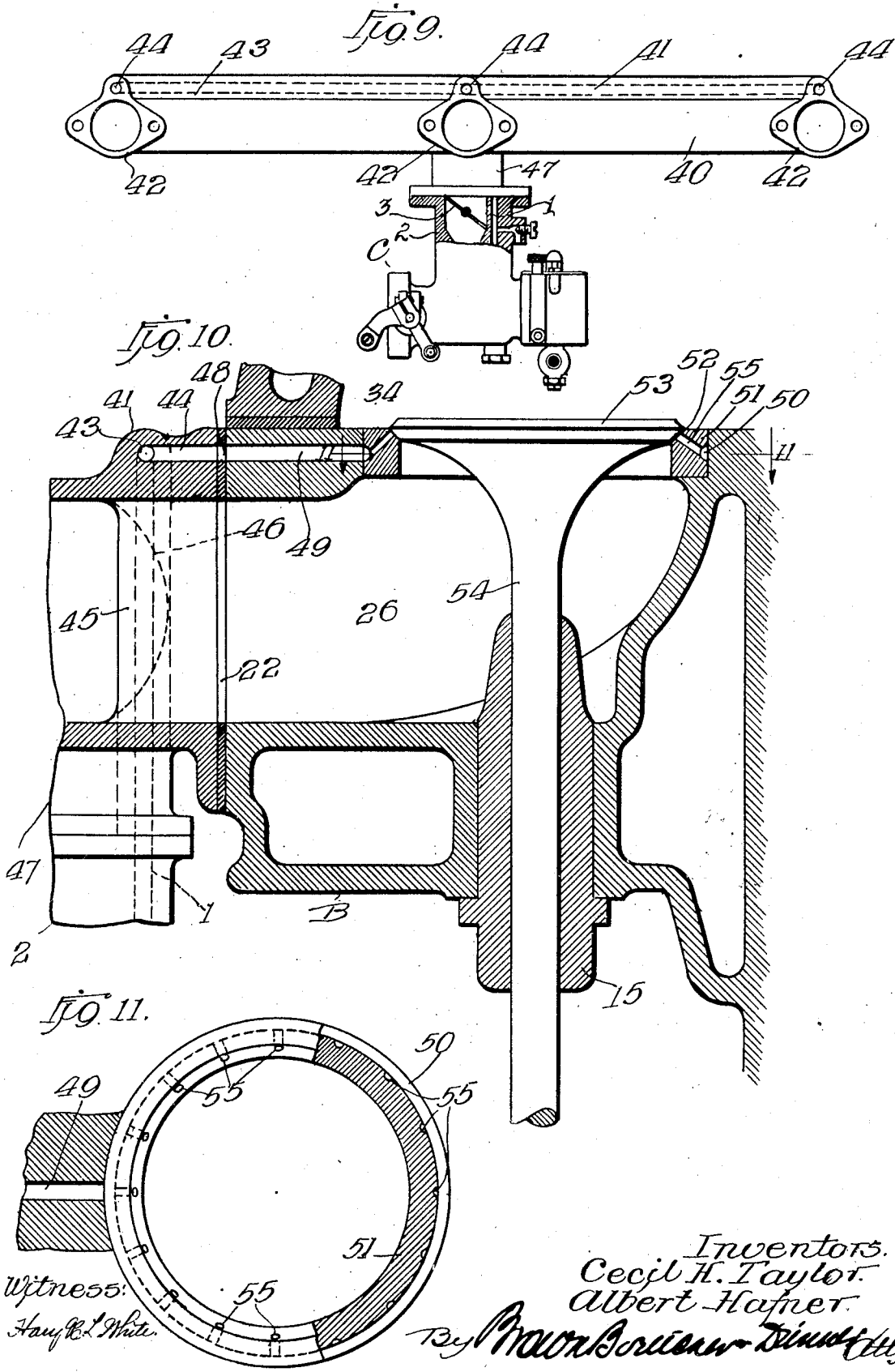

1,799,397

UNITED STATES PATENT OFFICE

CECIL HAMELIN TAYLOR AND ALBERT HAFNER, OF DETROIT, MICHIGAN

INTERNAL-COMBUSTION ENGINE

Application filed April 25, 1927. Serial No. 136,226.

This invention relates to internal combustion engines, and more particularly to means for supplying fuel to the combustion chamber when the engine is running at low speed or idling.

It is known to supply fuel to the intake manifold above and closely adjacent the throttle valve when the throttle is in closed position for running at low speed or idling. A common way of doing this is by means of a plain tube carburetor, of which the Stromberg and the Zenith carburetors are types, this carburetor having a metering fuel duct opening into the inlet manifold. This system of supplying fuel to the combustion chamber of the engine when running at low speed has not proved to be altogether satisfactory for several reasons, particularly when the engine is cold. When the throttle valve is in closed position, or substantially so, the flow of air through the manifold is comparatively weak, so that the fuel ejected into the manifold is not readily picked up and conveyed to the combustion chamber. This fuel, as it is discharged from the low speed duct of the carburetor is sprayed into the intake manifold where it becomes quickly chilled, due to contact with the manifold wall and the weak drag of the air current, the greater portion of the fuel being precipitated and collecting upon the manifold wall. This renders it practically impossible to supply fuel to the combustion chamber uniformly and in sufficient quantity to insure proper operation of the engine, particularly when the engine is cold, resulting in frequent missing and unsatisfactory operation.

We have found that the objections noted in connection with the present practice can be overcome by conducting the fuel to a point adjacent the inner end of the main fuel conduit formed by the manifold and the passage in the cylinder block, the fuel being then discharged into the combustion chamber. This result can be accomplished in various ways, though we prefer to conduct the metered fuel from the carburetor to a point closely adjacent the combustion chamber by a second conduit separate from the fuel passage of the inlet manifold, this second conduit being of relatively small cross-sectional area so that the fuel mixture is conducted to the point of ejection thereof in a substantially solid stream, avoiding expansion and consequent condensation of the mixture. This insures a proper and uniform supply to the combustion chamber of a fuel mixture of proper consistency to insure satisfactory operation of the engine at low speed, even when cold. In a broader aspect, our invention contemplates the provision of means for supplying fuel to the combustion chamber through the inlet manifold when the engine is running at medium or high speeds, in the known manner, in conjunction with a separate means or conduit for supplying fuel to the combustion chamber when the engine is operating at low speed, this second conduit being arranged to conduct the fuel to the point of ejectment at relatively high velocity in a substantially solid stream and ejecting the fuel either directly into the combustion chamber or into the inlet passage leading to this chamber at a point sufficiently close to the inlet valve opening to avoid any material condensation or drag of the fuel.

Further objects and advantages will appear from the detailed description.

In the drawings:—

Fig. 1 is a plan view of an inlet manifold constructed in accordance with our invention indicating its application to a six-cylinder internal combustion engine;

Fig. 2 is an inner side view of the manifold and the carburetor, partly broken away and in section;

Fig. 3 is a fragmentary vertical section through the valve portion of the cylinder block and associated parts;

Fig. 4 is a section through the valve stem taken substantially on line 4—4 of Fig. 5;

Fig. 5 is a fragmentary elevation of the valve stem;

Fig. 6 is a fragmentary section through the valve portion of the cylinder block showing a modified form;

Fig. 7 is a section taken substantially on line 7—7 of Fig. 6;

Fig. 8 is a fragmentary section through the valve portion of the cylinder block and associated parts showing a second modified form;

Fig. 9 is a view of a modified form of inlet manifold taken from the inner side thereof;

Fig. 10 is a fragmentary section through the valve portion of a cylinder block and associated parts showing a third modified form in connection with which the manifold illustrated in Fig. 9 is used; and Fig. 11 is a plan view, partly broken away and in section, of the valve seat ring in the form illustrated in Fig. 10, the adjacent portion of the cylinder block being shown fragmentarily and in section.

We have illustrated our invention as used in connection with a carburetor C of known type, the particular carburetor illustrated being what is known as the Stromberg plain tube carburetor, though any other suitable or preferred type of carburetor may be employed. We prefer to use a carburetor having a low speed fuel take-off, such as that illustrated, though any other suitable carburetor may be employed which can be connected to the low speed fuel conduit for supplying fuel thereto. Where the carburetor is not provided in the first instance with a low speed fuel take-off, it can be adapted for use by providing it with such a take-off. The carburetor illustrated is of standard construction and is provided with a fuel duct 1 leading from the low speed fuel take-off. As this carburetor is ordinarily constructed, the duct 1 opens into the neck 2 of the carburetor adjacent and slightly above the throttle valve 3. In our construction the duct 1 does not open into the neck 2, but is continued to the upper end thereof where it registers with a duct 4 in neck 5 of the inlet manifold 6. The duct 5 opens into a passage 7 in a rib 8 formed integrally with the manifold 6 at the under face thereof, this passage being formed by boring the rib out from end to end thereof, the ends of this passage being closed by screw plugs 9. A short rib 10 extends beneath the central portion of each arm 11 of the manifold and intersects rib 8. The ribs 10 are bored out from the inner end of arms 11, the passages 12 of these transverse ribs intersecting passage 7 and being closed at their outer ends by suitable plugs 13. These passages 7 and 12, instead of being bored out, can, if desired, be cored out when casting the manifold.

When the manifold 6 is in position, the transverse passages 10 register, at their inner ends, with two diverging passages 14, at the outer ends thereof, these passages intersecting each other at their outer ends and diverging inwardly of the cylinder block B.

Each of the passages 14 extends inwardly of the cylinder block B to the opening which receives the valve stem guide member 15. This member is provided, in its inner and outer faces, with annular channels 16 and 17, respectively, separated by a web 18 provided with openings or ports 19 establishing communication between the channels. The channel 17 is disposed to receive the fuel from passage 14 so that the fuel is supplied to the channel or space 16 extending about the intermediate portion of stem 20 of inlet valve 21. A packing gasket 22 is interposed between arm 11 of manifold 6 and the block B, this gasket being provided with a suitable opening 23 to permit ready flow of the fuel through passages 12 and 14.

The valve 21 and stem 20 thereof are of known construction, the valve and the stem being bored out axially from the upper end thereof to provide a passage 22', the upper end of which is closed by a screw plug 23'. A passage 24 is bored diametrically of the valve head adjacent the upper end thereof, and intersects passage 22. The stem 20 is provided with two slots 25 opening into passage 22 adjacent the lower end thereof, the outer sides of these slots corresponding in length approximately to the height of the channels 16 and 17 which are preferably, though not necessarily, of the same height. The slots 25 are so positioned as to be out of register with and below the channel 16 when the inlet valve 21 is in lowered or closed position. When the valve is raised or opened, the slots 25 register with the channel 16 to supply the fuel to passage 22 and, during the suction stroke of the engine this fuel is induced through the ends of passage 24 and ejected into the combustion chamber of the engine above the cylinder block. This injected fuel flows into the cylinder with the air drawn through the manifold, it being understood that a certain amount of air which is admitted through the carburetor is mixed with the fuel, this air and the air entering from the manifold being sufficient to support combustion. In this manner the fuel mixture is supplied directly into the combustion chamber of the engine when the engine is idling or running at low speeds, the fuel thus supplied being comparatively rich and insuring proper operation of the engine even when cold, since all possibility of condensation of the fuel mixture, due to contact with the cold walls of the inlet manifold, is eliminated.

The low speed fuel supply duct 1 of the carburetor, together with the passages of the manifold and the cylinder block, form, in conjunction with the spaces of the valve stem guide member and the valve stem passages, what is, in effect, a continuous conduit of very small cross-sectional area relative to the manifold 6, this conduit serving to convey the fuel directly from the low speed take-off of the carburetor to the combustion chamber of the engine. When the engine is operating at medium or high speed, the throttle valve 3 is opened sufficiently to create a strong flow of air through the carburetor into the manifold, the pull of this air current being sufficient to supply fuel to the manifold and, thence, to the combustion chamber of the engine in the usual manner. When operating at low speed, the throttle valve is in closed position so that the pull, kinetic or friction, of the air flow through the manifold is very weak. By disposing the outlet of the low speed fuel conduit closely adjacent the combustion chamber we insure that an ample supply of fuel will be injected into the combustion chamber and all dribbling or condensation of fuel, such as occurs where the fuel is admitted into the relatively large air passage of the manifold, in accordance with the present practice, is avoided. The neck 6 of the carburetor C, together with neck 5 of the manifold and the manifold itself, may be considered, in conjunction with the arm 11 of the manifold and the inlet fuel passages 26 of the cylinder block, as forming a second fuel conduit of relatively great area in cross-section for supplying the fuel mixture to the combustion chamber of the engine when operating at medium or high speed. We thus provide, in effect, two fuel supply conduits, one of very small cross-sectional area relative to the other and acting to convey the fuel mixture in a rich or substantially solid stream to a point closely adjacent the combustion chamber into which the fuel is injected during the suction stroke. While we prefer having these two conduits integrally united with each other in the carburetor and the inlet manifold, for the sake of simplicity and low cost of production, very similar results can be obtained by providing separate conduits and, if desired, separate sources of supply of fuel therefor, and we contemplate such variations where desired.

In the modified form illustrated in Fig. 6, the bore of the valve stem guide member 15 is enlarged from its upper end to provide a fuel receiving space 26 from the lower end of which extend ports 27 opening into an annular space or groove 28 in the outer face of member 15. A short distance from its upper end the valve guide member 15 is provided with a plurality of inwardly projecting guide ribs or elements 29 disposed radially thereof in spaced relation and serving to guide the upper portion of valve stem 30. This stem is provided at its upper end with a valve head 31 connected to the stem by a downwardly tapering neck 32. The valve head 31 seats in the upper end of the inlet opening 33 establishing communication between passage 26 and the combustion chamber 34 enclosed by the cylinder block B and the engine head H. The upper end of the valve stem guide member 15 is shaped to provide a seat which co-acts with a frusto-conical valve 35 carried by stem 30 at the upper end thereof. When the inlet valve 31 is closed the upper end of the guide member 15 is also closed, thus cutting off the supply of fuel to the combustion chamber. On the suction stroke the valve 31 is raised, thus opening the upper end of member 15 and permitting the fuel mixture to be ejected directly into combustion chamber 34 through the inlet opening 33. As the fuel mixture is ejected from the upper end of member 15, it is deflected outwardly by the valve 35 in the form of an inverted cone. This is advantageous as insuring thorough mixing of the fuel with the air which is drawn through passage 26 into the combustion chamber, thus obtaining somewhat better combustion than where the fuel is not thus spread out or sprayed.

In the modified form illustrated in Fig. 8, the bore of the guide member 15 is enlarged from the upper end thereof to provide a cylindrical chamber or space 35$^a$, the lower end of which is connected, by a short duct 36 to passage 14. A discharge nozzle 36$^a$ is secured in member 15 and opens into the chamber 35 adjacent the upper end thereof, the upper or discharge end of this nozzle extending into the inlet opening 33 beneath the head of the valve 37. Stem 38 of this valve is provided, adjacent the upper end of the guide member 15, with an enlargement forming a piston valve 38$^a$ which controls communication between the nozzle 36$^a$ and the chamber 35$^a$. When the valve 37 is in closed or lowered position, as illustrated in Fig. 8, the piston valve 38$^a$ closes the lower end of the nozzle. When the valve is raised, the piston valve 38$^a$ is raised to uncover or open the lower end of the nozzle, permitting the fuel mixture to be ejected from the upper end of the nozzle through the inlet opening 33 directly into the combustion chamber.

The construction of the manifold in the modified form illustrated in Figs. 9 to 11, is slightly different from the manifold illustrated in Figs. 1 and 2. Referring to Fig. 9, it will be noted that the manifold 40 is provided with a longitudinal rib 41 extending along its upper portion, this rib being extended inwardly along the arms 42 of the manifold. The rib is cored out to provide communicating passages 43 and 44, the latter of which opens at the inner ends of the arms 42. The manifold is further provided with a relatively short thickened portion or rib 45 which may be cored out or bored to provide a passage 46, the lower portion of which extends through neck 47 of the manifold, this passage being in register, at its lower end, with fuel duct 1 of neck 2 of the carburetor C. Passage 44 registers, at its inner end, with an opening 48 through gasket 22. The inner end of the opening 48 is in register with a passage 49 which opens into an annular channel 50 extending about a valve ring 51 mounted in the block B at the upper end of fuel inlet passage 26, this ring surrounding the fuel inlet opening for admission of fuel to the combustion chamber 34. The ring 51 has its upper portion shaped to provide a seat 52 for cooperation with an inlet valve 53, the stem 54 of which is slidable through guide member 15. This valve is of standard construction. The ring 51 is further provided with a plurality of short ducts 55 extending from the groove 50 and opening through the valve seat 52. When the valve 53 is in its closed position, it acts to close the upper ends of the ducts 55 so as to shut off communication between the low speed fuel supply and the combustion chamber, this valve also acting in its usual capacity to close the fuel inlet opening during the compression and combustion strokes. In this form it will be noted that the fuel is projected directly into the combustion chamber in a plurality of sprays so as to be thoroughly intermixed and commingled with the air drawn into the combustion chamber through the passage 26 and ring 51. This insures an ample supply of air to support combustion, since, by thoroughly mixing the air with the fuel mixture the available air is utilized to the best advantage.

To accelerate the flow of the fuel through duct 1, and to provide proper fuel and air metering, a valve controlled air inlet port or bleed is provided which opens into the duct. In Figs. 2 and 9, we have shown two different arrangements of the air bleed and valve, and it will be understood that any other suitable arrangement may be employed. The admission of air into the duct 1 below the throttle accelerates the flow of fuel through the duct, as stated, and this air also becomes mixed with the fuel supplementing the main air supply drawn through the inlet valve opening.

As above indicated, and as will be apparent to those skilled in the art, changes in construction and arrangement of the parts of our invention can be resorted to without departing from the field and scope of the same, and we intend to include all such variations, as fall within the scope of the appended claims, in this application in which the preferred forms only of our invention are disclosed.

What we claim is:—

1. In combination with an internal combustion engine, a source of fuel supply, means for supplying a fuel mixture from said source in vaporous form to the combustion chamber upon opening of the inlet valve when the engine is running at medium and high speeds, and means for admitting a fuel mixture to the valve opening in a metered stream to be sprayed directly into the combustion chamber when the engine is running at low speed.

2. In combination with an internal combustion engine, a source of fuel supply, means for supplying a fuel mixture from said source in vaporous form to the combustion chamber upon opening of the inlet valve when the engine is running at medium and high speeds, and means controlled by the inlet valve for admitting a fuel mixture to the valve opening in a metered stream to be sprayed directly into the combustion chamber when the engine is running at low speed.

3. In combination with an internal combustion engine, an inlet manifold, a carburetor communicating with said manifold, adjustable means for cutting off communication between the carburetor and the manifold, said carburetor having a low speed fuel mixture take-off, and means for conducting a fuel mixture in a metered stream from the carburetor take-off to a point adjacent the inlet valve opening to be sprayed directly into the combustion chamber upon opening of the inlet valve and when the carburetor is cut off from the manifold for operating the engine at low speed.

4. In combination with an internal combustion engine, an inlet manifold, a carburetor communicating with the manifold and having a low speed fuel mixture take-off, and a conduit of relatively small cross-sectional area establishing direct communication between said fuel mixture take-off and the port of the inlet valve of the engine, the inlet valve seat member having ducts directly communicating with said conduit and disposed to spray fuel mixture directly into the combustion chamber, said ducts being closed by the valve when said valve is closed.

5. In combination with an internal combustion engine, a source of fuel supply, a main conduit for conducting fuel mixture to the combustion chamber upon opening of the inlet valve, means adjustably controlling the effective cross-sectional area of said conduit, a supplemental conduit of relatively small cross-sectional area for conducting fuel mixture from said source of supply to the combustion chamber when the engine is running at low speed and the inlet valve is opened, and means for opening and closing said supplemental conduit in accordance with opening and closing of the inlet valve.

6. In combination with an internal combustion engine, a carburetor, two conduits connecting the carburetor to the combustion chamber of the engine, one of the conduits being of small cross-sectional area relative to the other conduit, means for opening and closing the smaller conduit in accordance with opening and closing of the engine inlet valve, and means for varying the effective cross-sectional area of the larger conduit.

7. In combination with an internal combustion engine, two fuel mixture conduits, one of said conduits being of small cross-sectional area relative to the other conduit, the smaller conduit opening into the larger conduit adjacent the inlet valve opening, means remote from the discharge end of the smaller conduit for varying the effective cross-sectional area of the larger conduit, means for opening and closing the smaller conduit in accordance with opening and closing of the inlet valve, and means for supplying fuel mixture to said conduits.

8. In combination with an internal combustion engine, a source of fuel supply, means for supplying a fuel mixture from said source in vaporous form to the combustion chamber upon opening of the inlet valve when the engine is running at medium and high speeds, and means for admitting a fuel mixture from said source to the valve opening in a metered stream to be sprayed directly into the combustion chamber when the engine is running at low speed.

9. In combination with an internal combustion engine, a carburetor, a fuel mixture inlet manifold extending from the carburetor, a throttle valve controlling the manifold, and means for supplying fuel mixture from the carburetor to the inlet valve port upon opening of the inlet valve and when the throttle valve is closed.

10. In combination with an internal combustion engine, a carburetor, an inlet manifold connecting the carburetor to the inlet valve port of the engine, a throttle valve controlling the manifold, and means for conducting fuel mixture from the carburetor and ejecting it through the inlet valve port upon opening of the inlet valve and when the throttle valve is closed.

11. In combination with an internal combustion engine, a carburetor, an inlet manifold connecting the carburetor to the inlet valve ports of the engine, a throttle valve controlling the manifold, and a conduit extending from the carburetor and having outlet openings disposed to admit a stream of fuel mixture through the inlet valve ports upon opening of the inlet valves and when the throttle valve is closed.

12. In combination with an internal combustion engine, an inlet manifold, a carburetor communicating with the manifold and having a low speed take-off, a conduit establishing communication between said take-off and the inlet valve port, and means carried by the inlet valve for closing and opening the conduit in accordance with closing and opening of the valve.

13. In combination with an internal combustion engine, an inlet manifold, a carburetor communicating with the manifold and having a low speed take-off, a conduit establishing communication between said take-off and the inlet valve port, and means for closing and opening the conduit adjacent the inner end thereof in accordance with closing and opening of the inlet valve.

In witness whereof, we hereunto subscribe our names this 18th day of April, 1927.

CECIL HAMELIN TAYLOR.
ALBERT HAFNER.